(12) United States Patent
Newby et al.

(10) Patent No.: US 8,961,169 B2
(45) Date of Patent: Feb. 24, 2015

(54) HIGH UNIFORMITY HEATING

(75) Inventors: John N. Newby, Newburgh Hts., OH (US); Thomas F. Robertson, Medina Township, OH (US); Justin R. Dzik, Strongsville, OH (US); William E. Tracey, West Chester, PA (US)

(73) Assignee: Fives North American Combustion, Inc., Cleveland, OH (US)

( * ) Notice: Subject to any disclaimer, the term of this patent is extended or adjusted under 35 U.S.C. 154(b) by 70 days.

(21) Appl. No.: 13/431,036

(22) Filed: Mar. 27, 2012

(65) Prior Publication Data

US 2012/0251960 A1    Oct. 4, 2012

Related U.S. Application Data

(60) Provisional application No. 61/468,825, filed on Mar. 29, 2011.

(51) Int. Cl.
*F23N 1/02* (2006.01)
*F23L 15/02* (2006.01)
*F23N 1/04* (2006.01)
*F23N 5/00* (2006.01)
*F23N 5/02* (2006.01)

(52) U.S. Cl.
CPC .................. *F23L 15/02* (2013.01); *F23N 1/042* (2013.01); *F23N 5/003* (2013.01); *F23N 5/022* (2013.01); *F23N 2021/08* (2013.01); *F23N 2021/12* (2013.01); *F23N 2025/14* (2013.01); *F23N 2035/04* (2013.01); *F23N 2035/06* (2013.01)
USPC ................... 431/12; 431/9; 431/20; 432/180; 432/181; 432/182

(58) Field of Classification Search
CPC ............................................ F23L 15/00–15/04
USPC .............. 431/9, 20, 51, 180–182, 12; 432/39, 432/165
See application file for complete search history.

(56) References Cited

U.S. PATENT DOCUMENTS

| | | |
|---|---|---|
| 3,062,521 A | 11/1962 | Kraschinsky, Jr. et al. |
| 3,998,615 A | 12/1976 | Gartz, Jr. et al. |
| 4,298,372 A | 11/1981 | Stover et al. |
| 4,334,861 A | 6/1982 | Bricmont |
| 4,756,688 A | 7/1988 | Hammond et al. |

(Continued)

OTHER PUBLICATIONS

Fives North American, "StepFire Burner Control System General Overview", Bulletin 8061, Jun. 1997, 2 pages, Cleveland, Ohio.

*Primary Examiner* — Kenneth Rinehart
*Assistant Examiner* — Gajanan M Prabhu
(74) *Attorney, Agent, or Firm* — Thompson Hine LLP

(57) ABSTRACT

A method includes the steps of operating a regenerative burner in cycles, including a firing cycle in which fuel and combustion air are discharged from the burner into a process chamber, and a nonfiring cycle in which a quantity of gas is withdrawn from the process chamber through a regenerative bed associated with the burner. The method further includes steps of detecting and responding to a temperature that differs from a predetermined temperature at a location in the process chamber. In a first step of responding to the detected temperature, a flue damper system is operated to vary a flow of gas within the process chamber relative to the location of the detected temperature. A second step of responding to the detected temperature reduces the quantity of gas to be withdrawn from the process chamber through the regenerative bed in a subsequent nonfiring cycle.

39 Claims, 4 Drawing Sheets

(56) References Cited

U.S. PATENT DOCUMENTS

| | | | |
|---|---|---|---|
| 5,314,170 A * | 5/1994 | Tada et al. | 266/156 |
| 5,374,403 A * | 12/1994 | Chang | 422/168 |
| 6,234,789 B1 | 5/2001 | Miyata | |
| 6,250,917 B1 | 6/2001 | Engelberg et al. | |
| 7,264,279 B2 * | 9/2007 | Rich et al. | 285/21.1 |
| 7,452,400 B2 * | 11/2008 | Robertson et al. | 75/414 |
| 7,838,297 B2 | 11/2010 | Widmer et al. | |
| 8,740,612 B2 * | 6/2014 | Kraus | 432/28 |

* cited by examiner

HIGH UNIFORMITY HEATING

RELATED APPLICATIONS

This application claims the benefit of provisional U.S. Patent Application No. 61/468,825, filed Mar. 29, 2011, which is incorporated by reference.

TECHNICAL FIELD

This technology includes furnaces with regenerative burners.

BACKGROUND

A furnace may be equipped with regenerative burners that fire into a process chamber containing a load to be heated. The burners are ordinarily operated in firing cycles in which they discharge fuel and combustion air into the process chamber, alternating with nonfiring exhaust cycles in which hot gas from the process chamber is drawn outward through regenerative beds at the burners. This heats the regenerative beds which, in turn, heat streams of incoming combustion air that are driven through the regenerative beds in the firing cycles. The alternating regenerative firing and exhaust cycles provide the process chamber with hot air and fuel to produce an atmosphere of gaseous products of combustion for heating the load.

SUMMARY OF THE INVENTION

A method includes the steps of operating a regenerative burner in cycles, including a firing cycle in which fuel and combustion air are discharged from the burner into a process chamber, and a nonfiring cycle in which a quantity of gas is withdrawn from the process chamber through a regenerative bed associated with the burner. The method further includes steps of detecting and responding to a temperature that differs from a predetermined temperature at a location in the process chamber. In a first step of responding to the detected temperature, a flue damper system is operated to vary a flow of gas within the process chamber relative to the location of the detected temperature. A second step of responding to the detected temperature reduces the quantity of gas to be withdrawn from the process chamber through the regenerative bed in a subsequent nonfiring cycle.

An alternative method operates a pair of regenerative burners in a regenerative mode with oppositely alternating firing and nonfiring cycles. In each firing cycle in the regenerative mode, one of the two burners discharges fuel and combustion air into a process chamber. In each nonfiring cycle in the regenerative mode, gas is withdrawn from the process chamber through a regenerative bed associated with one of the two burners. This method also includes a first step of responding to a detected temperature by operating a flue damper system to vary a flow of gas within the process chamber relative to the location of the detected temperature. A second step of responding to the detected temperature shifts the burners to a non-regenerative mode in which the two burners both discharge fuel and combustion air into the process chamber but gas is not withdrawn from the process chamber through a regenerative bed associated with either burner.

DETAILED DESCRIPTION

Figure 1:
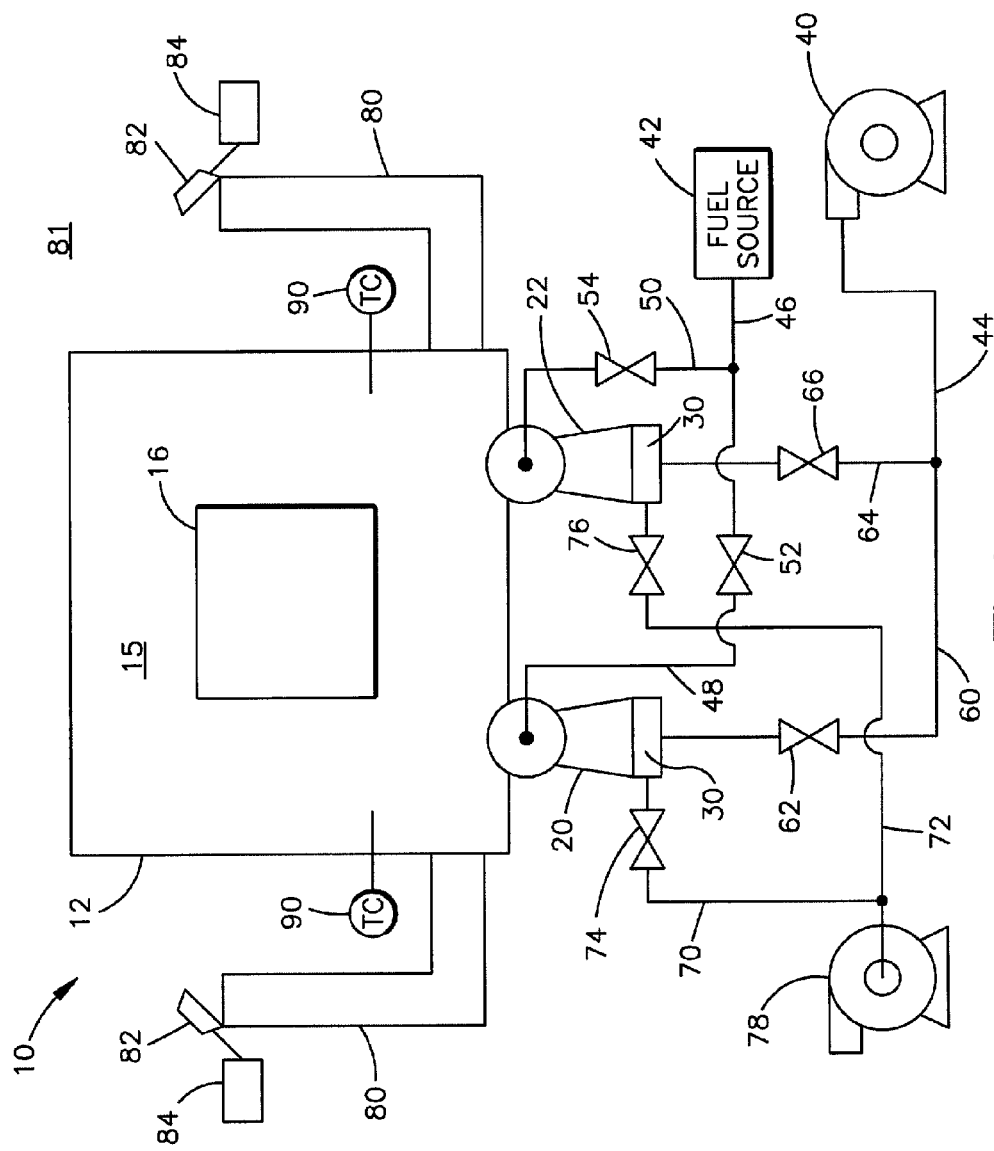
FIG. 1 is a schematic diagram of a furnace with a process chamber and regenerative burners that fire into the process chamber.

The furnace 10 shown schematically in the drawings can be operated in steps that are examples of the elements recited in the method claims, and has parts that are examples of the elements recited in the apparatus claims. The illustrated furnace 10 thus includes examples of how a person of ordinary skill in the art can make and use the claimed invention. It is described here to meet the enablement and best mode requirements of the patent statute without imposing limitations that are not recited in the claims. The various parts of the furnace 10, as shown, described and claimed, may be of either original or retrofitted construction as required to accomplish any particular implementation of the invention.

As shown in FIG. 1, the furnace 10 has a refractory wall structure 12 enclosing a process chamber 15. The process chamber 15 contains a load 16 of material to be heated in the furnace 10.

Regenerative burners 20 and 22, each of which has a regenerative bed 30, are arranged to fire into the process chamber 15. Although the schematic view of FIG. 1 shows only a first burner 20 and a second burner 22, the furnace 10 would typically be equipped with additional regenerative burners that are arranged in pairs among themselves and/or with the illustrated burners 20 and 22. Such additional burners could be arranged, for example, as shown and described in the provisional application.

When a burner 20 or 22 is fired, it discharges fuel and combustion air into the process chamber 15 for combustion to occur in the process chamber 15. Much of the combustion air supplied to a burner 20 or 22 is preheated by driving it through the respective regenerative bed 30. Specifically, when a burner 20 or 22 is not being fired into the process chamber 15, hot air and gaseous products of combustion can be drawn outward from the process chamber 15 through the regenerative bed 30. This heats the regenerative bed 30 which, in turn, heats incoming combustion air when the burner 20 or 22 is once again fired into the process chamber 15.

One or more combustion air blowers 40 and a source 42 of fuel, which is preferably the plant supply of natural gas, provide streams of those reactants along respective supply lines 44 and 46. The first and second burners 20 and 22 communicate with the fuel supply line 46 through first and second fuel branch lines 48 and 50 with respective fuel valves 52 and 54. A first combustion air branch line 60 with an inlet valve 62 reaches from the combustion air supply line 44 to the regenerative bed 30 at the first burner 20. A second combustion air branch line 64 with a respective inlet valve 66 reaches from the combustion air supply line 44 to the regenerative bed 30 at the second burner 22. The burners 20 and 22 also have respective exhaust lines 70, 72 and exhaust valves 74, 76. One or more exhaust gas blowers 78 are connected to the exhaust lines 70, 72.

As further shown in FIG. 1, a flue damper system includes one or more flues 80 reaching from the process chamber 15 to the external atmosphere 81. Each flue 80 has a damper 82 with an actuator 84 for shifting the damper 82 from a closed condition throughout a range of open conditions. Multiple temperature sensors 90, two of which are shown in FIG. 1, are arranged to sense temperatures at monitored locations within the process chamber 15.

Figure 2:
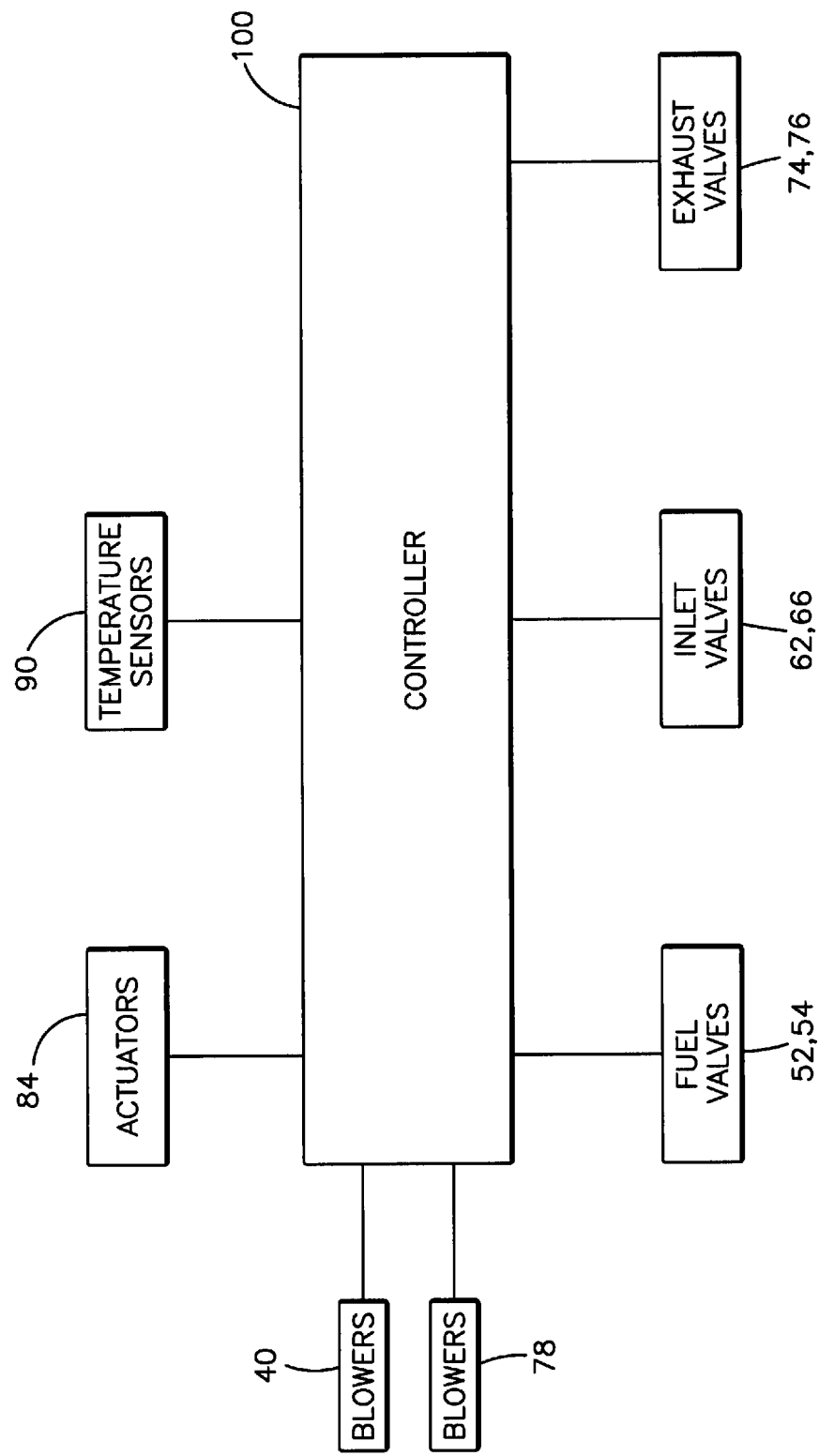
FIG. 2 is a block diagram of components of the furnace of FIG. 1.

As shown in FIG. 2, a controller 100 is operatively associated with the combustion air blowers 40, the exhaust gas blowers 78, the fuel valves 52, 54, the combustion air inlet valves 62, 66, and the exhaust valves 74, 76. The controller 100, which may comprise any suitable programmable logic controller or other control device, or combination of such control devices, has hardware and/or software configured to operate those parts of the furnace 10 to provide reactant streams for operating the burners 20 and 22. The controller 100 is also operatively associated with the actuators 84 and the temperature sensors 90 to operate the actuators 84 in response to the temperature sensors 90.

Figure 3:
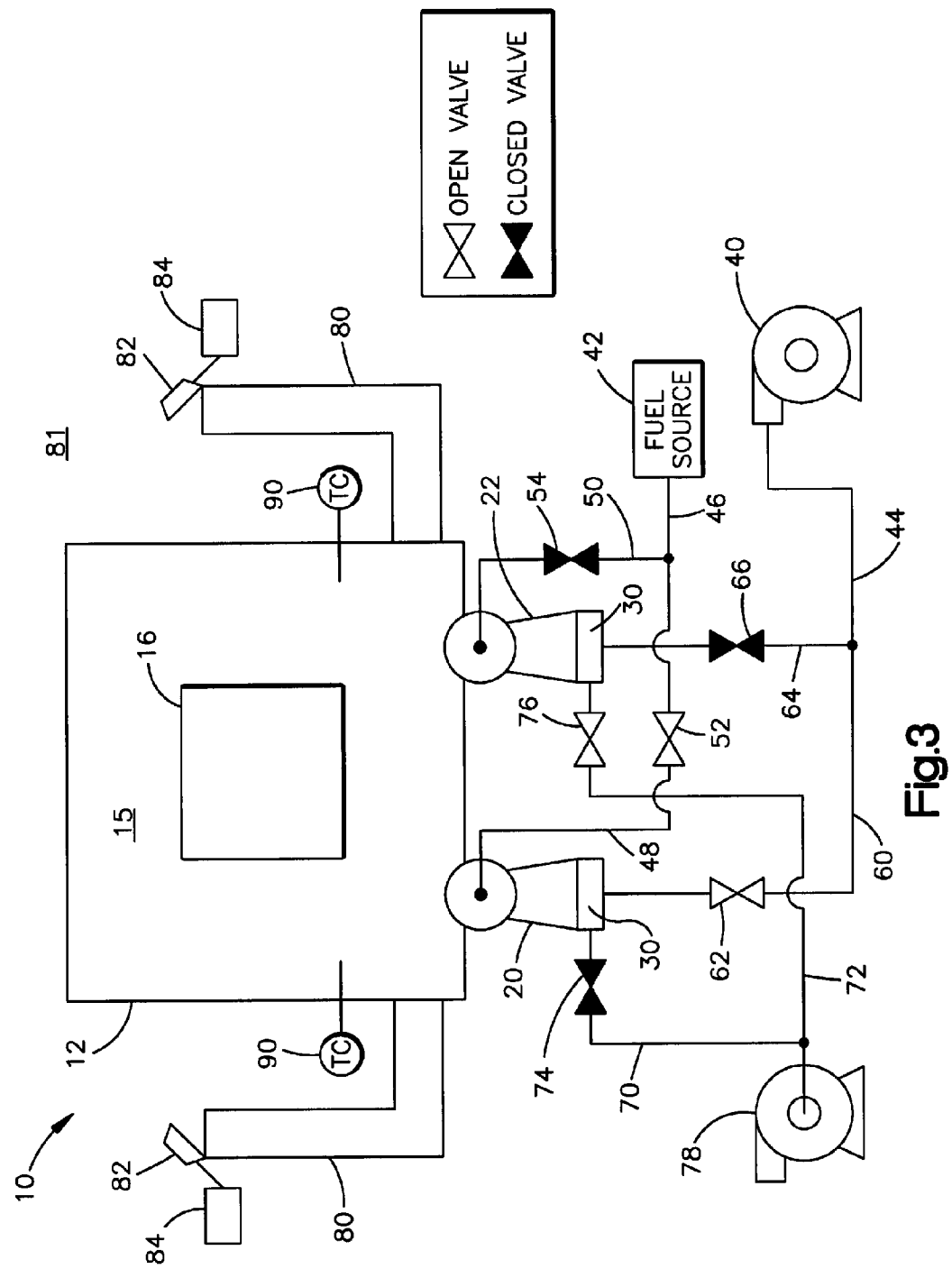
FIG. 3 is view similar to FIG. 1, showing operative conditions of parts of the furnace.
Figure 4:
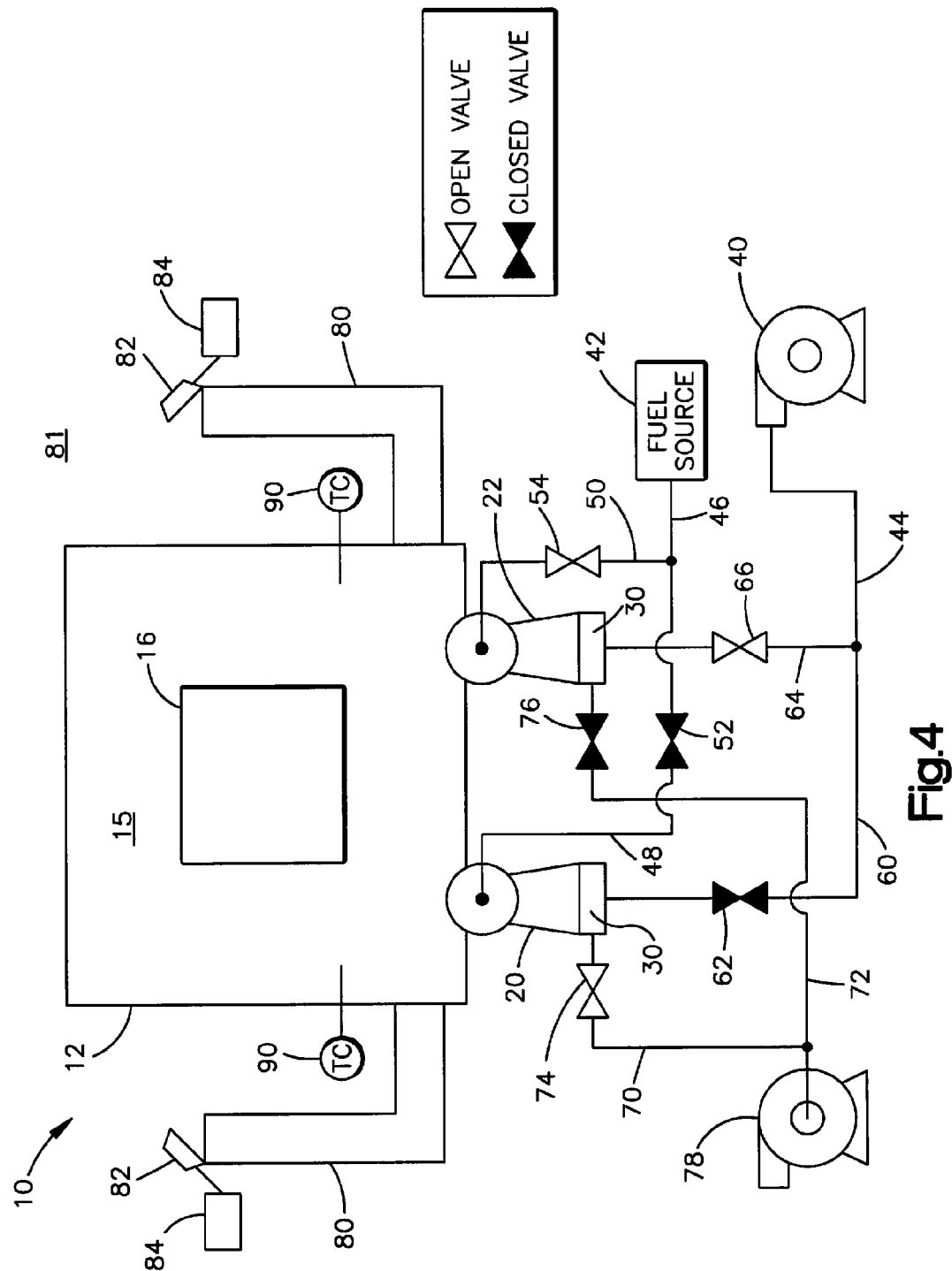
FIG. 4 is view similar to FIG. 3, showing parts of the furnace in differently operative conditions.

In an ordinary mode of operation, the controller 100 shifts the valves back and forth between the conditions of FIGS. 3 and 4. This cycles the burners 20 and 22 between the alternate operating conditions of FIGS. 3 and 4. In the condition of FIG. 3, the first fuel valve 52 is held open for fuel to flow to the first burner 20. The first combustion air inlet valve 62 is held open for combustion air to flow to the first burner 20 through the first regenerative bed 30. The first exhaust valve 74 is held closed to block the flow of gas outward through the first regenerative bed 30. The first burner 20 then operates in a regenerative firing condition. Simultaneously, the second fuel valve 54 and the second combustion air inlet valve 66 are held closed to block the flow of those reactants to the second burner 22, and the second exhaust valve 76 is held open for the exhaust blowers 78 to pull hot gases outward from the process chamber 15 through the second regenerative bed 30. The second burner 22 then operates in a regenerative exhaust condition while the first burner 20 is operating in the regenerative firing condition. These conditions are reversed in FIG. 4. The burners 20 and 22 are thus shifted between oppositely alternating regenerative firing and regenerative nonfiring cycles as the controller 100 shifts the valves back and forth between the conditions of FIGS. 3 and 4.

As the load 16 is being heated in the process chamber 15, the controller 100 can promote uniform heating of the load 16 by detecting and rectifying a nonuniformity in the hot air and gaseous combustion products that circulate in the process chamber 15. For example, with input from the temperature sensors 90, the controller 100 can detect a temperature that is below a predetermined temperature at a monitored location in the process chamber 15. The controller 100 can then respond by operating the actuators 84 to open, close, and/or modulate the flue dampers 82 to increase a flow of gas within the process chamber 15 from a higher temperature location to the low temperature location. The controller 100 can likewise detect a temperature that is above a predetermined temperature at a monitored location in the process chamber 15, and respond by operating the actuators 84 to open, close, and/or modulate the flue dampers 82 to increase a flow of gas within the process chamber 15 from a lower temperature location to the high temperature location. The controller 100 can thus operate the actuators 84 to vary flows of gas within the process chamber 15 as needed for greater uniformity of temperature throughout the process chamber 15.

In addition to operating the actuators 84 in response to the temperature sensors 90, the controller 100 can also operate the exhaust valves 74, 76 and the exhaust blowers 78 in response to the temperature sensors 90. For example, the controller 100 can operate either exhaust valve 74 or 76 to permit a quantity of hot gas to be withdrawn from the process chamber 15 through the respective regenerative bed 30 in a regenerative nonfiring condition as described above. If the controller 100 detects a temperature that differs from a predetermined temperature at a monitored location in the process chamber 15, it can respond by operating an exhaust valve 74 or 76 differently in its nonfiring cycle. The controller 100 can then hold the exhaust valve 74 or 76 in a lesser opened condition, and/or can modulate the exhaust valve 74 or 76 in a range of lesser opened conditions, to permit lower flow rates through the exhaust valve 74 or 76 and thereby to permit only a lesser quantity of gas to be withdrawn in the exhaust condition. The withdrawn quantity of gas can also be reduced by closing the exhaust valve 74 or 76 momentarily in the nonfiring cycle, and/or by holding the exhaust valve 74 or 76 open for a shorter period of time in the nonfiring cycle, with corresponding operation of the exhaust blowers 78. In each of these examples, the exhaust valve 74 or 76 is operated in a remedial exhaust condition that promotes uniformity in the process chamber 15 by removing less heat from the process chamber 15, and also by leaving more gas to redistribute for uniformity in the process chamber 15 under the influence of the flue dampers 82.

In a further remedial mode, the controller 100 can respond to an undesirable temperature by reducing the quantity of exhaust gas to zero. This can be accomplished in a fully direct firing mode by holding both exhaust valves 74 and 76 closed so that both burners 20 and 22 are simultaneously and continuously fired into the process chamber 15, with no exhaust gas permitted to flow outward through the regenerative beds 30. In an alternating direct firing mode, the burners 20 and 22 have oppositely alternating firing and nonfiring cycles, but each exhaust valve 74 and 76 is held closed during the entire interval between successive firing cycles at the corresponding burner 20 or 22 to provide nonfiring cycles in which no gas is withdrawn from the process chamber 15 through the regenerative beds 30 at burners 20 or 22. Such an alternating direct firing mode could include Step Firing (a trademark of Fives North American Combustion, Inc.) in which a burner 20 or 22 is operated at a higher firing rate for a shorter time in the interval between successive nonfiring cycles.

Each remedial mode of operation can be terminated by shifting the burners 20 and 22 back to the ordinary mode of alternating oppositely between regenerative firing and regenerative nonfiring cycles. This shift is preferably performed by the controller 100 upon detecting a predetermined condition such as, for example, the end of a soak period in which a control temperature of the process chamber 15 is held steady between temperature ramps upward or downward, the opening of a furnace door for removal or charging of a load to be heated, or completion of a final soak period in readiness for charging a fresh load.

The patentable scope of the invention is defined by the claims, and may include other examples of how the invention can be made and used. Such other examples, which may be available either before or after the application filing date, are intended to be within the scope of the claims if they have structural or method elements that do not differ from the literal language of the claims, or if they have equivalent structural or method elements with insubstantial differences from the literal language of the claims.

The invention claimed is:

1. A method comprising:
   operating a regenerative burner in cycles, including a firing cycle in which fuel and combustion air are discharged from the burner into a process chamber, and including a nonfiring cycle in which a quantity of gas is withdrawn from the process chamber through a regenerative bed associated with the burner;

operating an exhaust apparatus, including a blower and an exhaust valve, in an exhaust condition to withdraw the quantity of gas from the process chamber through the regenerative bed in the nonfiring cycle;

detecting a temperature that differs from a predetermined temperature at a location in the process chamber;

responding to the detected temperature by operating a flue damper system to vary a flow of gas within the process chamber relative to the location of the detected temperature;

responding to the detected temperature by shifting the exhaust apparatus to a different condition to withdraw gas from the process chamber through the regenerative bed in a lesser quantity in a subsequent nonfiring cycle; and operating the burner in the subsequent nonfiring cycle with the exhaust apparatus in the different condition and thereby withdrawing gas from the process chamber through the regenerative bed in the lesser quantity in the subsequent nonfiring cycle.

2. A method as defined in claim 1 wherein the exhaust apparatus is shifted to provide a lower flow rate at which gas is to be withdrawn from the process chamber through the regenerative bed in the subsequent nonfiring cycle.

3. A method as defined in claim 1 wherein the exhaust apparatus is shifted to provide a shortened period of time in which gas is to be withdrawn from the process chamber through the regenerative bed in the subsequent nonfiring cycle.

4. A method as defined in claim 1 wherein the quantity of gas to be withdrawn from the process chamber through the regenerative bed in the subsequent nonfiring cycle is reduced to zero.

5. A method as defined in claim 1 further comprising the steps of detecting a predetermined condition in the process chamber after operating the burner in the subsequent nonfiring cycle, and responding to the predetermined condition by operating the burner in a further subsequent nonfiring cycle in which the quantity of gas is again withdrawn from the process chamber through the regenerative bed.

6. A method as defined in claim 5 wherein the predetermined condition is the end of a soak period.

7. A method as defined in claim 5 wherein the predetermined condition is the opening of a door to the process chamber.

8. A method comprising:
operating a pair of regenerative burners in a regenerative mode in which the burners are alternated oppositely between firing cycles in which a burner discharges fuel and combustion air into a process chamber and nonfiring cycles in which gas is withdrawn from the process chamber through a regenerative bed associated with a burner;

operating a flue damper system to control flows of gas within the process chamber;

detecting a temperature that differs from a predetermined temperature at a location in the process chamber;

responding to the detected temperature by operating the flue damper system to vary a flow of gas within the process chamber relative to the location of the detected temperature; and further responding to the detected temperature by shifting the burners to a non-regenerative mode in which the burners both discharge fuel and combustion air into the process chamber but gas is not withdrawn from the process chamber through a regenerative bed associated with either burner.

9. A method as defined in claim 8 wherein, in the non-regenerative mode, the burners are operated simultaneously in firing conditions discharging fuel and combustion air into the process chamber.

10. A method as defined in claim 8 wherein, in the non-regenerative mode, the burners are operated alternately in firing conditions discharging fuel and combustion air into the process chamber.

11. A method as defined in claim 8 further comprising the steps of detecting a predetermined condition in the process chamber after shifting the burners to the non-regenerative mode, and responding to the predetermined condition by shifting the burners back to the regenerative mode.

12. A method as defined in claim 11 wherein the predetermined condition is the end of a soak period.

13. An apparatus comprising:
a furnace process chamber;
a flue damper system;
a regenerative burner having a regenerative bed;
means for operating the burner in cycles, including a firing cycle in which fuel and combustion air are discharged from the burner into the process chamber, and including a nonfiring cycle in which a quantity of gas is withdrawn from the process chamber through the regenerative bed;

an exhaust apparatus including a blower and an exhaust valve;

means for operating the exhaust apparatus in an exhaust condition to withdraw the quantity of gas from the process chamber through the regenerative bed in the nonfiring cycle;

means for detecting a temperature that differs from a predetermined temperature at a location in the process chamber;

means for responding to the detected temperature by operating the flue damper system to vary a flow of gas within the process chamber relative to the location of the detected temperature;

means for responding to the detected temperature by shifting the exhaust apparatus to a different condition to withdraw gas from the process chamber through the regenerative bed in a lesser quantity in a subsequent nonfiring cycle; and means for operating the burner in the subsequent nonfiring cycle.

14. An apparatus as defined in claim 13 wherein the means for responding to the detected temperature by shifting the exhaust apparatus to a different condition includes means for reducing a rate at which gas is withdrawn from the process chamber through the regenerative bed in the subsequent nonfiring cycle.

15. An apparatus as defined in claim 13 wherein means for responding to the detected temperature by shifting the exhaust apparatus to a different condition includes means for reducing a period of time in which gas is withdrawn from the process chamber through the regenerative bed in the subsequent nonfiring cycle.

16. An apparatus as defined in claim 13 wherein the means for responding to the detected temperature by shifting the exhaust apparatus to a different condition includes means for blocking gas from being withdrawn from the process chamber through the regenerative bed in the subsequent nonfiring cycle.

17. An apparatus as defined in claim 13 further comprising means for detecting a predetermined condition in the process chamber after operating the burner in the subsequent nonfiring cycle; and means for responding to the predetermined condition by operating the burner in a further subsequent nonfiring cycle in which the quantity of gas is again withdrawn from the process chamber through the regenerative bed.

18. An apparatus as defined in claim 17 wherein the predetermined condition is the end of a soak period.

19. An apparatus as defined in claim 17 wherein the predetermined condition is the opening of a door to the process chamber.

20. An apparatus comprising:
a furnace process chamber;
a flue damper system;
a pair of regenerative burners, each of which is associated with a regenerative bed;
means for operating the burners in a regenerative mode in which the burners are alternated oppositely between firing cycles in which a burner discharges fuel and combustion air into the process chamber and nonfiring cycles in which gas is withdrawn from the process chamber through a regenerative bed associated with a burner;
means for operating the flue damper system to control flows of gas within the process chamber;
means for detecting a temperature that differs from a predetermined temperature at a location in the process chamber;
means for responding to the detected temperature by operating the flue damper system to vary a flow of gas within the process chamber relative to the location of the detected temperature; and
means for further responding to the detected temperature by shifting the burners to a non-regenerative mode in which the burners discharge fuel and combustion air into the process chamber but gas is not withdrawn from the process chamber through a regenerative bed associated with a burner.

21. An apparatus as defined in claim 20 wherein, in the non-regenerative mode, the burners are operated simultaneously in firing conditions discharging fuel and combustion air into the process chamber.

22. An apparatus as defined in claim 20 wherein, in the non-regenerative mode, the burners are operated alternately in firing conditions discharging fuel and combustion air into the process chamber.

23. An apparatus as defined in claim 20 further comprising means for detecting a predetermined condition in the process chamber after shifting the burners to the non-regenerative mode, and responding to the predetermined condition by shifting the burners back to the regenerative mode.

24. An apparatus as defined in claim 23 wherein the predetermined condition is the end of a soak period.

25. A method comprising:
operating a regenerative burner in cycles, including a firing cycle in which fuel and combustion air are discharged from the burner into a process chamber and a nonfiring cycle in which a quantity of gas is withdrawn from the process chamber through a regenerative bed associated with the burner;
operating a flue damper system to control flows of gas within the process chamber;
detecting a temperature that differs from a predetermined temperature at a location in the process chamber;
responding to the detected temperature by operating the flue damper system to vary a flow of gas within the process chamber relative to the location of the detected temperature;
responding to the detected temperature by reducing the quantity of gas to be withdrawn from the process chamber through the regenerative bed in a subsequent nonfiring cycle; and
further responding to the detected temperature by operating the burner in the subsequent nonfiring cycle;
wherein the quantity of gas to be withdrawn from the process chamber through the regenerative bed in the subsequent nonfiring cycle is reduced by reducing the time during which the gas is to be withdrawn from the process chamber through the regenerative bed.

26. A method comprising:
operating a regenerative burner in cycles, including a firing cycle in which fuel and combustion air are discharged from the burner into a process chamber and a nonfiring cycle in which a quantity of gas is withdrawn from the process chamber through a regenerative bed associated with the burner;
operating a flue damper system to control flows of gas within the process chamber;
detecting a temperature that differs from a predetermined temperature at a location in the process chamber;
responding to the detected temperature by operating the flue damper system to vary a flow of gas within the process chamber relative to the location of the detected temperature;
responding to the detected temperature by reducing the quantity of gas to be withdrawn from the process chamber through the regenerative bed in a subsequent nonfiring cycle;
further responding to the detected temperature by operating the burner in the subsequent nonfiring cycle; and
detecting a predetermined condition in the process chamber after operating the burner in the subsequent nonfiring cycle, and responding to the predetermined condition by operating the burner in a further subsequent nonfiring cycle in which the quantity of gas is again withdrawn from the process chamber through the regenerative bed;
wherein the predetermined condition is the opening of a door to the process chamber.

27. A method comprising:
operating a pair of regenerative burners in a regenerative mode in which the burners are alternated oppositely between firing cycles in which a burner discharges fuel and combustion air into a process chamber and nonfiring cycles in which gas is withdrawn from the process chamber through a regenerative bed associated with a burner;
operating a flue damper system to control flows of gas within the process chamber;
detecting a temperature that differs from a predetermined temperature at a location in the process chamber;
responding to the detected temperature by operating the flue damper system to vary a flow of gas within the process chamber relative to the location of the detected temperature; and
further responding to the detected temperature by shifting the burners to a non-regenerative mode in which the burners both discharge fuel and combustion air into the process chamber but gas is not withdrawn from the process chamber through a regenerative bed associated with either burner;
wherein, in the non-regenerative mode, the burners are operated alternately in firing conditions discharging fuel and combustion air into the process chamber; and wherein, in the non-regenerative mode, the burners are operated at respective firing rates that differ from each other.

28. A method comprising:

operating a pair of regenerative burners in a regenerative mode in which the burners are alternated oppositely between firing cycles in which a burner discharges fuel and combustion air into a process chamber and nonfiring cycles in which gas is withdrawn from the process chamber through a regenerative bed associated with a burner;

operating a flue damper system to control flows of gas within the process chamber;

detecting a temperature that differs from a predetermined temperature at a location in the process chamber;

responding to the detected temperature by operating the flue damper system to vary a flow of gas within the process chamber relative to the location of the detected temperature;

further responding to the detected temperature by shifting the burners to a non-regenerative mode in which the burners both discharge fuel and combustion air into the process chamber but gas is not withdrawn from the process chamber through a regenerative bed associated with either burner; and detecting a predetermined condition in the process chamber after shifting the burners to the non-regenerative mode, and responding to the predetermined condition by shifting the burners back to the regenerative mode;

wherein the predetermined condition is the opening of a door to the process chamber.

29. An apparatus comprising:

a furnace process chamber;

a flue damper system;

a regenerative burner having a regenerative bed;

means for operating the burner in cycles, including a firing cycle in which fuel and combustion air are discharged from the burner into the process chamber and a nonfiring cycle in which a quantity of gas is withdrawn from the process chamber through the regenerative bed;

means for operating the flue damper system to control flows of gas within the process chamber;

means for detecting a temperature that differs from a predetermined temperature at a location in the process chamber;

means for responding to the detected temperature by operating the flue damper system to vary a flow of gas within the process chamber relative to the location of the detected temperature;

means for responding to the detected temperature by reducing the quantity of gas to be withdrawn from the process chamber through the regenerative bed in a subsequent nonfiring cycle;

means for further responding to the detected temperature by operating the burner in the subsequent nonfiring cycle;

means for detecting a predetermined condition in the process chamber after operating the burner in the subsequent nonfiring cycle; and means for responding to the predetermined condition by operating the burner in a further subsequent nonfiring cycle in which the quantity of gas is again withdrawn from the process chamber through the regenerative bed;

wherein the means for operating the burner in cycles includes means for withdrawing gas from the process chamber through the regenerative bed at a first rate in the nonfiring cycle, and the means for responding to the detected temperature by reducing the quantity of gas to be withdrawn from the process chamber through the regenerative bed in a subsequent nonfiring cycle includes means for reducing a rate at which gas is withdrawn from the process chamber through the regenerative bed.

30. An apparatus comprising:

a furnace process chamber;

a flue damper system;

a regenerative burner having a regenerative bed;

means for operating the burner in cycles, including a firing cycle in which fuel and combustion air are discharged from the burner into the process chamber and a nonfiring cycle in which a quantity of gas is withdrawn from the process chamber through the regenerative bed;

means for operating the flue damper system to control flows of gas within the process chamber;

means for detecting a temperature that differs from a predetermined temperature at a location in the process chamber;

means for responding to the detected temperature by operating the flue damper system to vary a flow of gas within the process chamber relative to the location of the detected temperature;

means for responding to the detected temperature by reducing the quantity of gas to be withdrawn from the process chamber through the regenerative bed in a subsequent nonfiring cycle;

means for further responding to the detected temperature by operating the burner in the subsequent nonfiring cycle;

means for detecting a predetermined condition in the process chamber after operating the burner in the subsequent nonfiring cycle; and means for responding to the predetermined condition by operating the burner in a further subsequent nonfiring cycle in which the quantity of gas is again withdrawn from the process chamber through the regenerative bed;

wherein the means for operating the burner in cycles includes means for withdrawing gas from the process chamber through the regenerative bed for a first period of time in the nonfiring cycle, and the means for responding to the detected temperature by reducing the quantity of gas to be withdrawn from the process chamber through the regenerative bed in a subsequent nonfiring cycle includes means for reducing the period of time in which gas is withdrawn from the process chamber through the regenerative bed.

31. An apparatus comprising:

a furnace process chamber;

a flue damper system;

a regenerative burner having a regenerative bed;

means for operating the burner in cycles, including a firing cycle in which fuel and combustion air are discharged from the burner into the process chamber and a nonfiring cycle in which a quantity of gas is withdrawn from the process chamber through the regenerative bed;

means for operating the flue damper system to control flows of gas within the process chamber;

means for detecting a temperature that differs from a predetermined temperature at a location in the process chamber;

means for responding to the detected temperature by operating the flue damper system to vary a flow of gas within the process chamber relative to the location of the detected temperature;

means for responding to the detected temperature by reducing the quantity of gas to be withdrawn from the process chamber through the regenerative bed in a subsequent nonfiring cycle;

means for further responding to the detected temperature by operating the burner in the subsequent nonfiring cycle;

means for detecting a predetermined condition in the process chamber after operating the burner in the subsequent nonfiring cycle; and means for responding to the predetermined condition by operating the burner in a further subsequent nonfiring cycle in which the quantity of gas is again withdrawn from the process chamber through the regenerative bed;

wherein the means for responding to the detected temperature by reducing the quantity of gas to be withdrawn from the process chamber through the regenerative bed in a subsequent nonfiring cycle includes means for blocking gas from being withdrawn from the process chamber through the regenerative bed.

32. An apparatus comprising:
a furnace process chamber;
a flue damper system;
a regenerative burner having a regenerative bed;
means for operating the burner in cycles, including a firing cycle in which fuel and combustion air are discharged from the burner into the process chamber and a nonfiring cycle in which a quantity of gas is withdrawn from the process chamber through the regenerative bed;
means for operating the flue damper system to control flows of gas within the process chamber;
means for detecting a temperature that differs from a predetermined temperature at a location in the process chamber;
means for responding to the detected temperature by operating the flue damper system to vary a flow of gas within the process chamber relative to the location of the detected temperature;
means for responding to the detected temperature by reducing the quantity of gas to be withdrawn from the process chamber through the regenerative bed in a subsequent nonfiring cycle;
means for further responding to the detected temperature by operating the burner in the subsequent nonfiring cycle;
means for detecting a predetermined condition in the process chamber after operating the burner in the subsequent nonfiring cycle; and
means for responding to the predetermined condition by operating the burner in a further subsequent nonfiring cycle in which the quantity of gas is again withdrawn from the process chamber through the regenerative bed;
wherein the predetermined condition is the end of a soak period.

33. An apparatus comprising:
a furnace process chamber;
a flue damper system;
a regenerative burner having a regenerative bed;
means for operating the burner in cycles, including a firing cycle in which fuel and combustion air are discharged from the burner into the process chamber and a nonfiring cycle in which a quantity of gas is withdrawn from the process chamber through the regenerative bed;
means for operating the flue damper system to control flows of gas within the process chamber;

means for detecting a temperature that differs from a predetermined temperature at a location in the process chamber;
means for responding to the detected temperature by operating the flue damper system to vary a flow of gas within the process chamber relative to the location of the detected temperature;
means for responding to the detected temperature by reducing the quantity of gas to be withdrawn from the process chamber through the regenerative bed in a subsequent nonfiring cycle;
means for further responding to the detected temperature by operating the burner in the subsequent nonfiring cycle;
means for detecting a predetermined condition in the process chamber after operating the burner in the subsequent nonfiring cycle; and
means for responding to the predetermined condition by operating the burner in a further subsequent nonfiring cycle in which the quantity of gas is again withdrawn from the process chamber through the regenerative bed;
wherein the predetermined condition is the opening of a door to the process chamber.

34. An apparatus comprising:
a furnace process chamber;
a flue damper system;
a pair of regenerative burners, each of which is associated with a regenerative bed;
means for operating the burners in a regenerative mode in which the burners are alternated oppositely between firing cycles in which with a burner discharges fuel and combustion air into the process chamber and nonfiring cycles in which gas is withdrawn from the process chamber through a regenerative bed associated with a burner;
means for operating the flue damper system to control flows of gas within the process chamber;
means for detecting a temperature that differs from a predetermined temperature at a location in the process chamber;
means for responding to the detected temperature by operating the flue damper system to vary a flow of gas within the process chamber relative to the location of the detected temperature; and
means for further responding to the detected temperature by shifting the burners to a non-regenerative mode in which the burners discharge fuel and combustion air into the process chamber but gas is not withdrawn from the process chamber through a regenerative bed associated with a burner;
wherein, in the non-regenerative mode, the burners are operated at respective firing rates that differ from each other.

35. An apparatus comprising:
a furnace process chamber;
a flue damper system;
a pair of regenerative burners, each of which is associated with a regenerative bed;
means for operating the burners in a regenerative mode in which the burners are alternated oppositely between firing cycles in which with a burner discharges fuel and combustion air into the process chamber and nonfiring cycles in which gas is withdrawn from the process chamber through a regenerative bed associated with a burner;
means for operating the flue damper system to control flows of gas within the process chamber;

means for detecting a temperature that differs from a predetermined temperature at a location in the process chamber;

means for responding to the detected temperature by operating the flue damper system to vary a flow of gas within the process chamber relative to the location of the detected temperature;

means for further responding to the detected temperature by shifting the burners to a non-regenerative mode in which the burners discharge fuel and combustion air into the process chamber but gas is not withdrawn from the process chamber through a regenerative bed associated with a burner; and means for detecting a predetermined condition in the process chamber after shifting the burners to the non-regenerative mode, and responding to the predetermined condition by shifting the burners back to the regenerative mode;

wherein the predetermined condition is the opening of a door to the process chamber.

36. A method comprising:

operating a regenerative burner in cycles, including a firing cycle in which fuel and combustion air are discharged from the burner into a process chamber, and including a nonfiring cycle in which a quantity of gas is withdrawn from the process chamber through a regenerative bed associated with the burner;

operating an exhaust apparatus, including a blower and an exhaust valve, in an exhaust condition to withdraw the quantity of gas from the process chamber through the regenerative bed in the nonfiring cycle;

detecting a temperature that differs from a predetermined temperature at a location in the process chamber;

responding to the detected temperature by operating a flue damper system to vary a flow of gas within the process chamber relative to the location of the detected temperature;

responding to the detected temperature by shifting the exhaust apparatus to a different condition blocking the withdrawal of gas from the process chamber through the regenerative bed; and operating the burner in a subsequent nonfiring cycle with the exhaust apparatus in the different condition and thereby blocking the withdrawal of gas from the process chamber through the regenerative bed in the subsequent nonfiring cycle.

37. A method as defined in claim 36 further comprising the steps of detecting a predetermined condition in the process chamber after operating the burner in the subsequent nonfiring cycle, and responding to the predetermined condition by operating the burner in a further subsequent nonfiring cycle in which the quantity of gas is again withdrawn from the process chamber through the regenerative bed.

38. A method as defined in claim 37 wherein the predetermined condition is the end of a soak period.

39. A method as defined in claim 37 wherein the predetermined condition is the opening of a door to the process chamber.

* * * * *